April 7, 1942.        H. M. CHRISTENSEN        2,278,864
METHOD OF AND MEANS FOR PLANTING
Filed Dec. 19, 1940        2 Sheets-Sheet 1

Fig. 1.

H. M. Christensen
INVENTOR.

BY *Ashnow Co.*
ATTORNEYS.

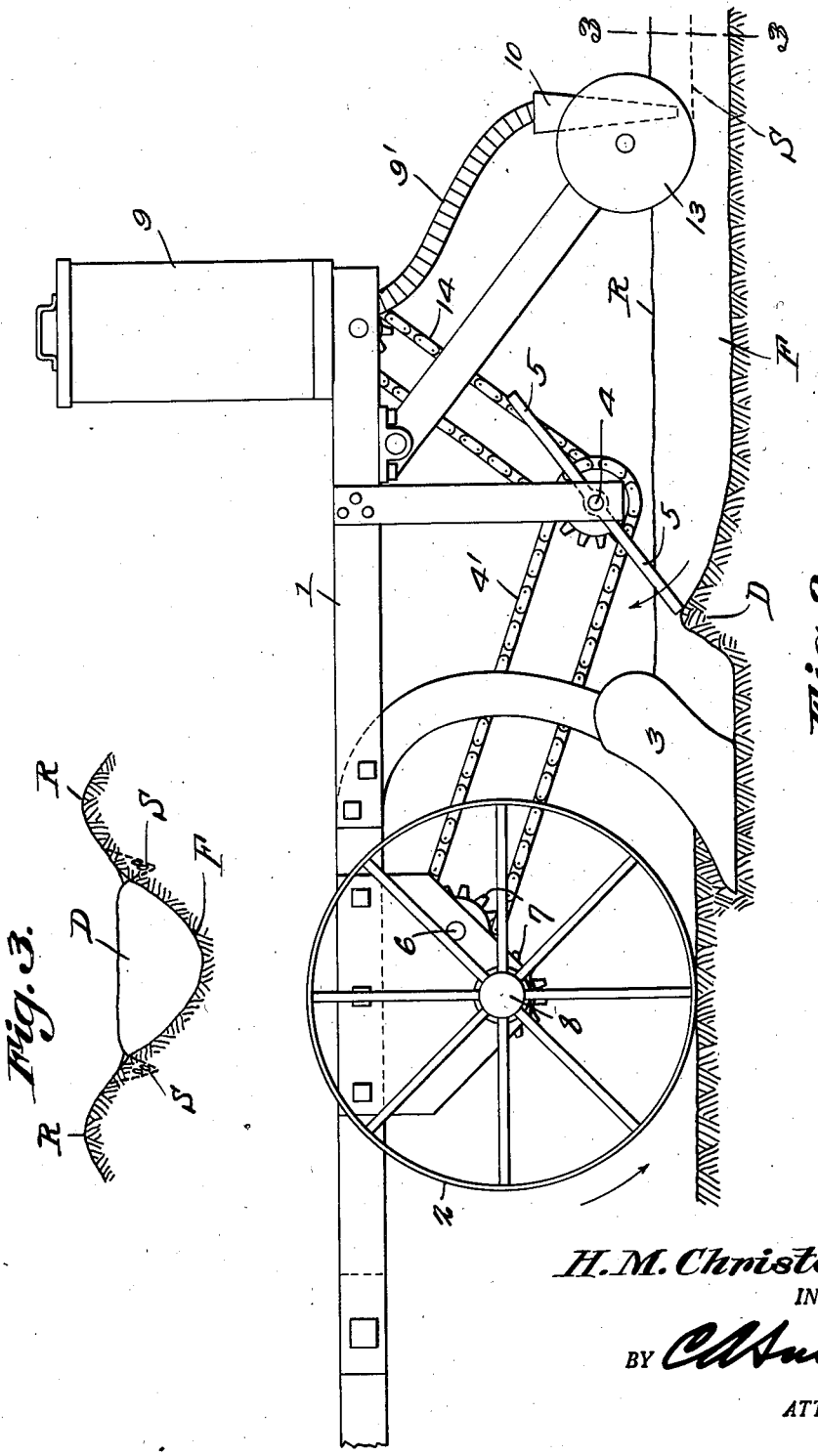

Patented Apr. 7, 1942

2,278,864

UNITED STATES PATENT OFFICE 2,278,864

METHOD OF AND MEANS FOR PLANTING

Herman M. Christensen, Concordia, Kans.

Application December 19, 1940, Serial No. 370,890

5 Claims. (Cl. 111—14)

This invention relates to a method of and a means for planting and is designed primarily for use in areas where it is desirable to dam the furrows at short distances apart for the purpose of retaining moisture. The practice of producing dams in furrows is well known and has been followed advantageously under certain conditions. It has been found in practice, however, in the planting of grains, that the production is vastly increased if the seeds are deposited in the soil within the sides of the furrows below the ridges but above the bottom levels of the furrows. The improved results from this location of the seeds are due to the fact that various disadvantages heretofore encountered are overcome. For example, in localities where rains are infrequent but heavy, accumulated moisture between the dams acts to drown the seeds planted in the bottoms of the furrows. In localities where there is soil errosion due to high winds, seeds planted in the bottoms of the furrows or in the tops of the ridges are damaged by the shifting soil.

As a result of many experiments it has been discovered that when small seeds are planted in the sides of the furrows, they will not be dislodged or damaged by shifting soil nor will they be damaged by accumulated moisture. Furthermore the roots from the planted seed embedded in the soft but firm ground with moist earth both above and below, become strong and healthy and insure a tall growth of vegetation and a very small loss of grain, because of the healthy germination. Obviously should the seeds be planted in the tops of the ridges they would be so far from the moisture in the bottoms of the furrows that growth would be retarded and, should they be planted in the bottoms of the furrows, many of the seeds would become drowned where there is heavy rainfall. Such a situation has been remedied in part by allowing some of the excess moisture to drain through opened dams but this has resulted in loss of moisture which could well be utilized in the growth of the plants.

Aside from the foregoing advantages in planting seeds in the sides of the furrows above the bottom levels, there is the further advantage of permitting cultivation of the soil after planting. This has been impossible where the seeds have been planted in the ridges or where they have been planted in the bottoms of the furrows because, in both cases, the seeds have been either uncovered or covered and consequently damaged as a result of the cultivating operation.

Heretofore no thought has been given to planting seeds anywhere except at the bottoms of the furrows or in the tops of the ridges between the furrows because the dammer, which has followed the planter, would have dislodged most of the seeds as it sweeps along and within the furrows.

An object of the present invention is to provide an arrangement of parts whereby the dams can be formed ahead of the planter and the seed then planted in continuous rows extending lengthwise of the sides of the furrows above the bottoms thereof but well below the ridges. Thus the seeds will root at the most desirable location where they cannot be drowned by excess moisture nor uncovered or excessively covered or displaced by winds or by a cultivator.

With the foregoing and other objects in view which will appear as the description proceeds, the invention consists of certain novel details of construction and combinations of parts and in certain steps of the method hereinafter more fully described and pointed out in the claims, it being understood that changes may be made in the construction and arrangement of parts and in the disclosed method without departing from the spirit of the invention as claimed.

In the accompanying drawings there has been illustrated one form of apparatus whereby the method herein presented can be accomplished.

In said drawings

Figure 1 is a top plan view of a combined furrow opener, dammer and planter.

Figure 2 is a side elevation thereof, the relative positions of the parts in the soil being shown in a furrow which is in section.

Figure 3 is an enlarged section through a furrow on the line 3—3, Figure 2.

Referring to the figures by characters of reference, 1 designates a frame which can be supported by wheels 2 or in any other suitable manner and is adapted to extend over one or more furrows. In the present structure a two-furrow apparatus has been illustrated, the furrow openers being indicated at 3. Behind these furrow openers is a transverse shaft 4 to which are secured blades 5 arranged in pairs, the blades of each pair being extended oppositely from each other. Shaft 4 is driven by chain and sprocket mechanism 4' from a counter-shaft 6 which, in turn, receives motion in any suitable manner, as by means of gear 7, from a rotatable axle 8.

Planting mechanism is located at the back of the frame 1 and in the present instance includes seed boxes 9 each of which has a delivery spout or tube 9' extending therefrom to a shoe 10 located close to one side of a furrow opener which can be in the form of a concavo-convex disk 13 connected to frame 1 in any suitable manner. This disk is so supported that it will not reach the bottom of a furrow F and is, instead, so located that it will cut along the side of a furrow at a point above the bottom level thereof but below the ridge R of the furrow. It is preferred to have a pair of shoes 10 in each furrow so that seeds can be planted in each side of the furrow, it being understood of course that one disk is provided for each of these shoes for the purpose of covering the seeds after they have been planted in the sides of the furrow. Obviously the dropping mechanism of the planter can be operated by any suitable means such as chain and sprocket mechanism 14 driven by the shaft 4 or any other working part of the machine.

In practice the machine is drawn over a field to be planted and each furrow will be opened by one of the members 3 as indicated at F. Immediately following each furrow opener are the revolving blades 5 which travel in the direction indicated by the arrow in Figure 2. These blades act to sweep portions of the soil forwardly and form dams extending partly toward the top of the furrow. Following the formation of the dams D by the blades 5, the seeds, which are being deposited in the shoes 10 through the tubes 9', are directed into the soft soil forming the sides of the furrow but at a level well above the bottom of the furrow but below the ridge R, as indicated at S. Thus each side of the furrow will have a row of seeds therein and this row will extend continuously either over or through the top portions of the dams. Consequently there will be no displacement of the seeds after they have once been planted, nor will the seeds be flooded or provided with an excessive covering of soil. In case of heavy rains, the moisture will be retained by the dams but the seeds, by reason of their location, will not become drowned. Instead the roots will be free to extend upwardly and downwardly so as to produce vigorous growth. Should the soil be shifted either from cultivation or by the action of heavy winds, the seeds will still be protected from injury because of their location.

It has been found in practice that by following this method of planting the yield has been increased many times.

What is claimed is:

1. The herein described method of planting which includes the step of opening a furrow, forming transverse dams in the furrow, and thereafter planting a row of seeds in a side of the furrow a substantial distance above the bottom of the furrow and below the top of the furrow ridge.

2. The herein described method of planting small grains which includes the step of opening a furrow, forming transverse dams therein, and planting the seeds in a row in each side of the furrow at a level substantially the same as the top of the dams.

3. The herein described method of planting small seeds in one continuous operation which includes the step of opening a furrow, forming at regular intervals transverse dams in the furrow, and depositing seeds in the sides of the furrow in rows extending across the end portions of the dams adjacent to the tops thereof.

4. A machine of the class described including a movably supported frame, furrow-opening means carried by the frame, means carried by the frame and working back of the furrow-opening means for forming transverse dams in the furrow, and seed dropping means carried by the frame positioned to deposit seeds in a side of the furrow along a line extending longitudinally of the furrow and close to the top level of the dams.

5. A machine of the class described including a movably supported frame, and separate means carried by the frame while moving in one direction, for opening a furrow, forming transverse dams in the furrow, and depositing seeds in the side of the furrow along a line extending longitudinally of the furrow and close to the top level of the dams, respectively, said means including a furrow opener, a rotatable dam-forming blade back of the furrow opener, a seed dropper back of the blade and positioned to deposit seeds in the side of the furrow along said line, and means for covering the seeds when deposited.

HERMAN M. CHRISTENSEN.